Feb. 5, 1924.  1,483,033
P. H. WISMAN
SCOOTER
Filed Aug. 12, 1922
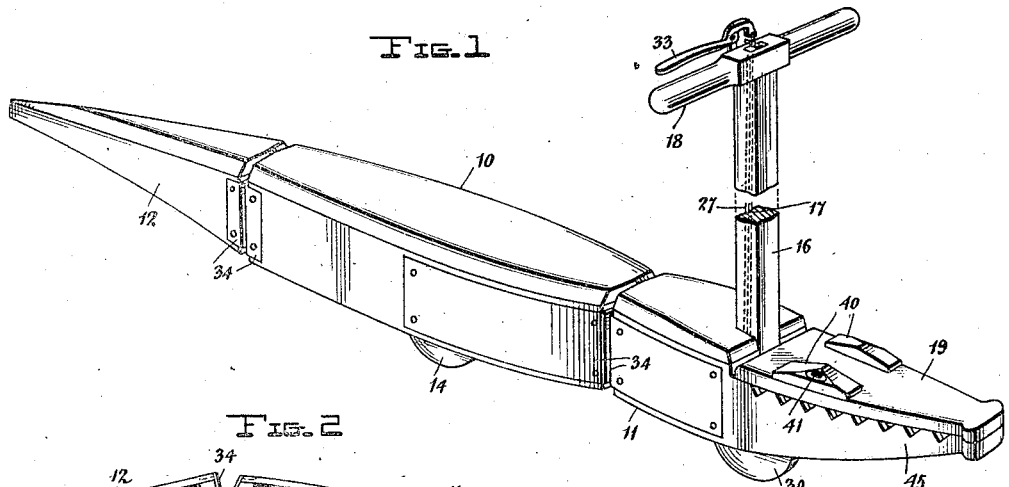
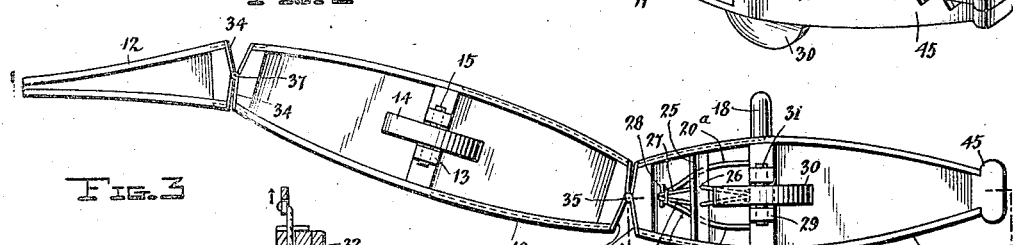
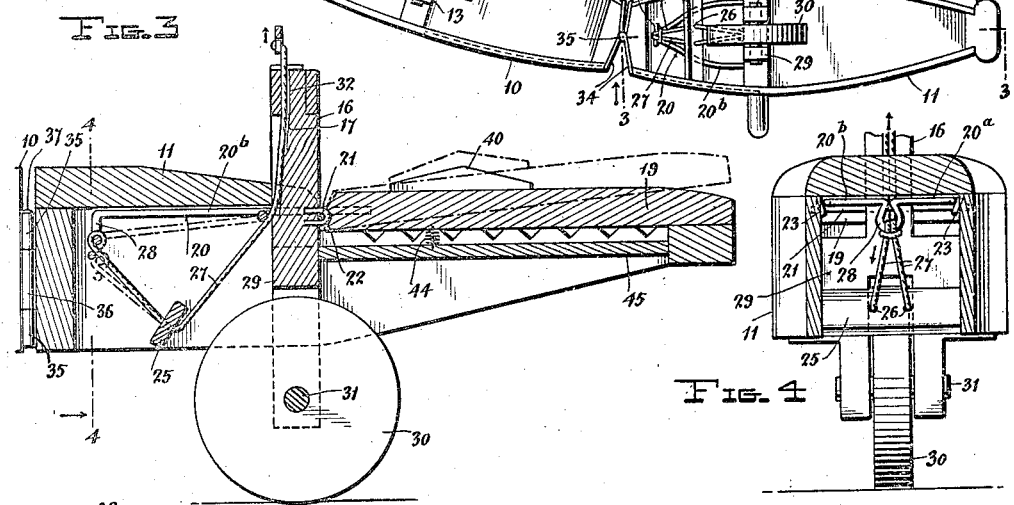
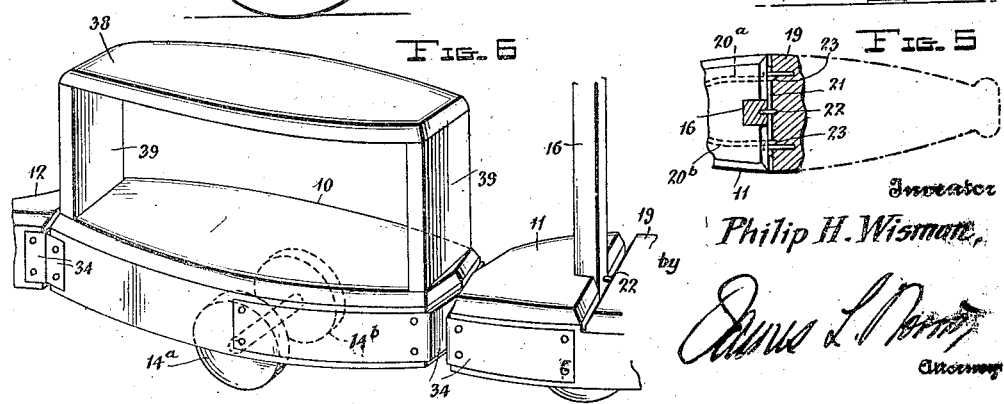
Inventor
Philip H. Wisman,
by
James L. Norris
Attorney Patented Feb. 5, 1924.

1,483,033

UNITED STATES PATENT OFFICE.

PHILIP H. WISMAN, OF WASHINGTON, DISTRICT OF COLUMBIA.

SCOOTER.

Application filed August 12, 1922. Serial No. 581,498.

*To all whom it may concern:*

Be it known that I, PHILIP H. WISMAN, a citizen of the United States of America, residing at Washington, in the District of Columbia, have invented certain new and useful Improvements in Scooters, of which the following is a specification.

The present invention relates to toys of the vehicular type known as scooters, scooty cars, kiddy cars and the like and objects of the invention are simplicity of construction and operation, and economy in manufacture.

Other objects are to construct a vehicular toy of this character to resemble an animal or reptile and so that the guiding movements thereof may cause the toy to simulate the movements of the animal simulated.

Other objects are to combine with the device parts movable to simulate the movement of certain members of the animal and to so construct the device that the above named movements will be under the control of the operator.

I accomplish the above named objects by constructing the vehicle in sections hinged together and by mounting certain of the sections on wheels or rollers, and by providing guiding and controlling means on one of said sections.

Another object of the invention is to so construct the vehicle that the greater part of the weight of the operator when riding the vehicle will naturally rest on one section and a lesser part on another section of the vehicle.

Referring to the drawings:—

Figure 1 is a perspective view showing the vehicle of my invention made to simulate an alligator.

Figure 2 is a bottom plan view of the device showing the lever mechanism for operating the jaw of the alligator, the relation of the wheels to the sections, and also illustrating the hinged connection between the sections;

Figure 3 is a longitudinal sectional view on line 3—3, Figure 2, through the front section of the device illustrating, on a somewhat enlarged scale compared with Figures 1 and 2, the lever mechanism and manipulating cord for operating the jaw of the alligator;

Figure 4 is a cross sectional view on the line 4—4, Figure 3, showing the jaw-operating mechanism;

Figure 5 is a fragmentary detailed plan view showing the specific hinge connection between the jaw and head section; and Figure 6 illustrates a slightly different form of my device adapted to be used as a kiddy car having a seat raised above the middle section and provided with a pair of rollers spaced apart both centrally located on the same axis beneath the middle section.

Referring to the drawings in detail, the device comprises a middle section 10, a head section 11 and a tail section 12 hingedly connected together for relative angular movement. The sections each consist of a top and side member curved upon lines to resemble parts of the animal or reptile to be simulated, the tail section converging rearwardly and the middle section and head being bowed outwardly at the middle.

Secured midway of the middle section is a bracket 13 in which a roller or wheel may be carried by a pin 15. There may be one or more of these rollers. As shown in Figure 6, there are two, 14ª and 14ᵇ both located on the same axis at the center of the middle section and this construction of the device may be provided with an elevated seat 38 and used as a kiddy car.

Secured in the head section and extending vertically upwardly therefrom is a steering post 16 (see Figure 1), preferably having its rear face grooved, as at 17, and provided at its upper end with a transversely extending handle bar 18. The steering post is preferably located midway of the ends of the head section and closer to the rear end than to the forward end thereof, leaving a space between the post and rear end of the head section for a purpose which will later appear.

Hinged to the forward section is a movable member 19, simulating a jaw and having a lever arm 20 extending rearwardly therefrom below the top of the section 11. The lever may consist of a pair of diverging prongs 20ª and 20ᵇ, the forward ends of which are driven into the jaw member. The jaw 19 is hinged to the head section by means of a rod 21 pivoted to the head section by a staple 22 and passing through loops 23 formed in the prongs 20ª and 20ᵇ. The movable jaw 19 may be supported when at rest by a relatively stationary jaw 45 formed integral with the head section.

Located below the lever arm is a cross bar 25 centrally provided with a pair of apertures 26 to permit the passage of actuating members as cords or wires 27 secured to the lever. The lever is preferably provided at its rear end with a downwardly extending loop 28 to which the cords are attached and which by its construction prevents the slipping of the cord forwardly on the lever.

The steering post 16 extends downwardly within the head section and is broadened at 29 below the top of said section to brace the side walls of the head section and also to form a support for the steering wheel 30, the portion 29 of the steering post being kerfed to receive said wheel which is secured in the kerf by a pin 31.

The groove 17 extends below the cover of the head section 11 a sufficient distance to afford a passageway through the top of the head section for the cords which pass upwardly in the groove and through a hole 32 formed in the handle bar 18. Any suitable device for actuating the cord as a lever 33 may be secured to the cord and for preventing slipping of the cord too far down through the aperture 32.

The hinges by which the sections are secured together preferably consist of a pair of plates 34 of sheet metal extending over the ends of the sections and lapping over the sides, the plates on the middle and head sections thereof preferably extending to the middle of the sections for purposes of strength. These plates are provided centrally with cylindrical portions 35 and 36, having bores adapted to be brought into alignment to receive a coupling pin 37.

In the form of my device illustrated in Figure 6, the seat 38 is spaced from the top of the middle section by upright supports 39, the height of the seat being such as to elevate the operator seated thereupon so that he can propel the device with his feet, the pair of wheels giving the device stability.

The operation of the device as illustrated in Figures 1 and 2 is as follows: The operator places one foot upon the section 10, propelling the device with the other foot until the desired momentum is attained. The foot used for propelling may then be lifted from the ground and the toe rested on the section 11. In this manner while the greater portion of the operator's weight will be supported by the section 10 and will be located directly above the wheel 14, a portion of the weight will rest upon the section 11. The operator holds the handle bar 18 with his hands, and the device may be steered by the hands assisted by the toe resting on the section 11. At the same time the operator may move the hinged member or jaw 19 by means of the lever 33 through the medium of the cords 27, and there may be provided a spring or elastic 44 attached above and to the upper jaw 19 and the other to the lower stationary jaw 45, the tendency of which will be to clap the jaw 19 down suddenly against the stationary jaw 45 when the lever 33 is released, thereby giving a snapping movement to the jaw 19. The sinuous movement of the body of the device in guiding the same, especially in the case of simulating a reptile, as an alligator, together with the movement of the jaw, will give the device a very life-like appearance and will add very considerably to the pleasure derived by a child in using the same. The body of the device may be painted any suitable color, preferably, in the present illustration, a dark green with certain variations, and the mouth may be painted red showing white teeth.

The eyes may be formed by the use of triangular blocks 40 attached to the jaw 19 and having portions cut away, at 41, and suitably painted to simulate the pupils of the eyes. The operation of the form of my device shown in Figure 6 is similar to that of the ordinary kiddy car and needs no further explanation.

What is claimed as new is:—

1. In a device of the character described, a middle section, and end sections hingedly attached thereto, a wheel supporting said middle section and a wheel supporting one of said end sections, an upright secured rigidly on one of the sections adapted to be grasped by the operator, an angularly movable member on said section and means controlled by the operator for moving said angularly movable member.

2. In a device of the character described comprising hinged sections, the forward section simulating the head of an animal, a hinged member on said forward section movable to simulate the movement of a member of the animal simulated, a handle secured to said forward section and means associated with said handle and hinged member for angularly moving the hinged member, said means being adapted to be controlled by the operator of the device.

3. In a device of the character described, sections hinged together for angular movement relative to each other, one of said sections having a roller positioned midway of its ends, another section having a roller positioned rearwardly of its transverse medial line and a steering post secured to the second named section, said post being rigid with said second named section and extending vertically upward from said second named roller.

4. In an amusement vehicle a plurality of hinged sections simulating in contour the body of an animal, certain of said sections being supported by rollers positioned midway of their length, a steering post rigid with and a member hingedly secured to the forward section, and means controlled at will by the operator for moving said hinged member.

5. In a device of the character described a middle section and end sections hingedly attached thereto, a wheel secured to the middle section below its longitudinal medial line, a wheel secured to one of the end sections and positioned beneath its longitudinal medial line, an upright secured to said last named section and adapted to be grasped by the operator.

6. In a device of the character described sections hinged together for angular movement relative to each other, one of said sections having a roller positioned midway of its ends and below its longitudinal medial line, another section having a roller positioned rearwardly of its transverse medial line, and a steering post secured to the second named section, said post being rigid with said second named section and extending vertically upward from said second named roller.

7. In an amusement vehicle a plurality of hinged sections simulating in contour the body of an animal, certain of said sections being supported by rollers positioned midway of their length and beneath the longitudinal central line, a steering post rigid with and a hinged member secured to the forward section and means controlled at will by the operator for moving said hinged member, a cord attached thereto and extending to the top of the steering post.

In testimony whereof I have hereunto set my hand in presence of two subscribing witnesses.

PHILIP H. WISMAN.

Witnesses:
JOHN L. FLETCHER,
R. H. FRAVEL.